(No Model.)
I. L. ROBERTS.
PROCESS OF AND APPARATUS FOR MANUFACTURING METALLIC CARBIDS.
No. 587,138. Patented July 27, 1897.
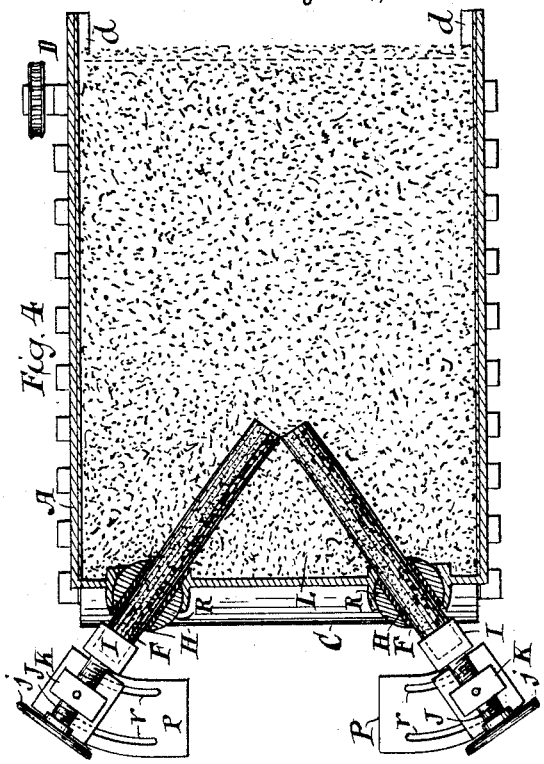
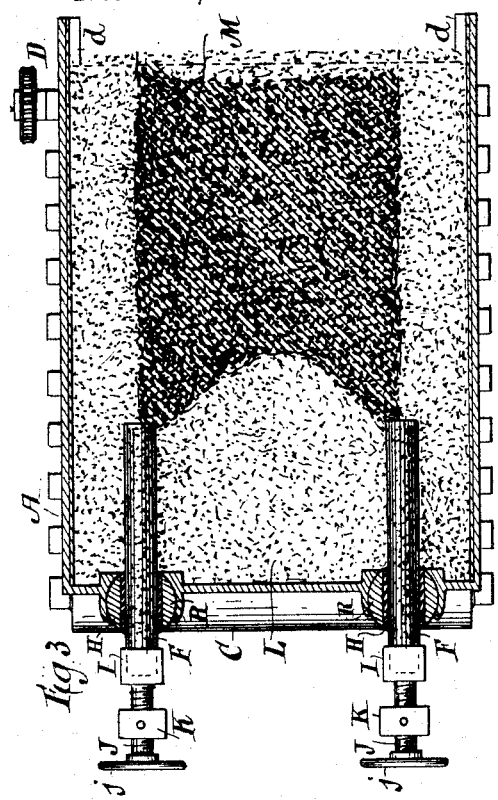
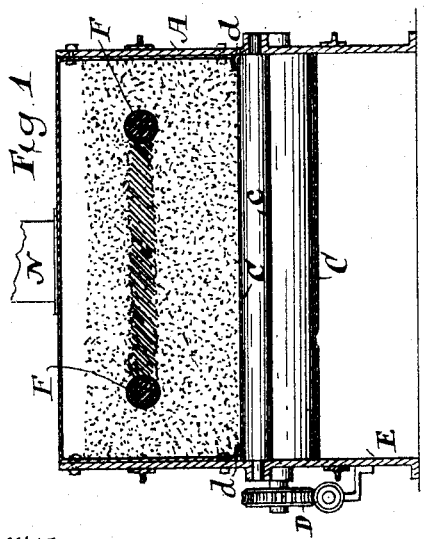
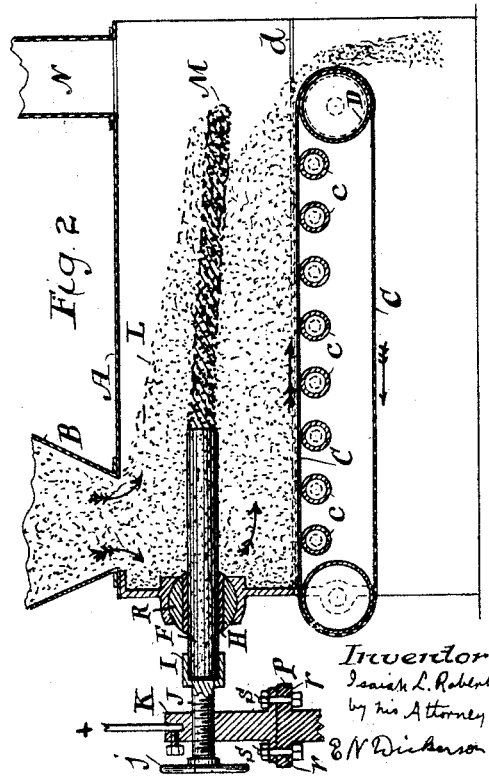
Witnesses
Inventor
Isaiah L. Roberts
by his Attorney

UNITED STATES PATENT OFFICE.

ISAIAH L. ROBERTS, OF NIAGARA FALLS, NEW YORK.

PROCESS OF AND APPARATUS FOR MANUFACTURING METALLIC CARBIDS.

SPECIFICATION forming part of Letters Patent No. 587,138, dated July 27, 1897.

Application filed December 29, 1896. Serial No. 617,305. (No model.)

*To all whom it may concern:*

Be it known that I, ISAIAH L. ROBERTS, of Niagara Falls, in the State of New York, have invented a new and useful Improvement in Processes of and Apparatus for the Manufacture of Metallic Carbids, of which the following is a full, true, and exact description, reference being had to the accompanying drawings.

Metallic carbids have heretofore been produced by the electric arc in a mass of carbon and oxid by elevating or drawing away one electrode from the other, and after some carbid has been thus produced on or in one electrode, as in a pot or crucible, the said carbid comes to be a part of said crucible or electrode, being electrically connected thereto. Carbids have also been attempted to be made by bringing the said mixture into contact with highly-heated conducting carbon rods or bars and also by arranging a number of pieces of conducting-carbon end to end through a mass of carbon and oxid particles forming a continuous conductor and by other methods; but my invention relates to moving a mass of oxid and carbon particles between two electrodes and establishing a body of carbid between them and moving the latter away from both electrodes continuously or at such intervals or rate that the current of electricity is not broken. This method of producing carbids has several advantages over those mentioned above, such as saving of electrodes, which in most of the methods are rapidly destroyed, and also in that it is continuous and therefore avoids the necessity of idle furnaces, as in an intermittent process.

Inasmuch as my process is one in which the carbids are made within the mixed mass and removed as formed, there is less volatilization of the carbid after formation than is the case with the stationary-arc method. In my process the formation of the carbid takes place in the mass of a non-conducting material, and therefore little or no heat is lost by radiation.

In order to carry out the above-described process, I make use of the apparatus shown in the accompanying drawings, in which like letters refer to like parts in all of them, and in which—

Figure 1 is a vertical cross-section of my apparatus. Fig. 2 is a longitudinal cross-section. Fig. 3 is a plan cross-section, and Fig. 4 shows the position of the electrodes on starting.

To construct the apparatus and practice the process, I proceed as follows:

I construct a sheet-iron container, which may be open at one end and closed at the other, except for the hopper or chute B, Fig. 2. Beneath the chute the endless belt C, Figs. 1 and 2, is arranged, which is held up by the rollers $c\ c\ c\ c$ and driven in the direction of the arrows by the driving-roller D. The edges of the belt run beneath the turned-under strips of sheet metal $d\ d$, Fig. 1, which prevents leakage of the material. I prefer to make this belt of wire-cloth, each wire previous to being woven being covered with asbestos thread, thus making said belt impervious to the pulverized carbon and oxid it must carry, and also strong and capable of withstanding considerable heat. I prefer to make the frame E and rollers $c\ c\ c\ c$ of iron.

To operate this apparatus and make carbid, I first place two carbon electrodes F F in the position shown in Fig. 4. These are pushed through adjustable stuffing-boxes H H, having asbestos packing, which insulates the said electrodes from the iron casing A. The packing is contained in an adjustable support—as, for instance, a ball-and-socket joint R—allowing the electrodes to swing inward and together, as shown in Fig. 4. These electrodes are held by metal holders I I, which are attached to or are made integral with screw-spindles J J, and have insulated hand-wheels $j\ j$ attached thereto. The said screw-spindle passes through a screw-block K, which has an attachment for an electrical conductor. In order that the electrodes may travel in the same plane when adjusted, their lower ends are supported upon fixed plates P, having slots $r$ serving as tracks for the lower ends of the blocks K. They can be guided upon the plates P by pins S, moving in the radial slots $r$. Having inserted the electrodes, I bring the ends together, as shown in Fig. 4, and fill the container or casing A with the above-described mixture L through the hopper or chute B. I then start a small current at first through the circuit made by the contact of the two electrodes and then slightly separate them by drawing the hand-wheels and supports K K toward each other. This increases the resistance by making an arc, which at once begins to produce carbid. I then increase the current and continue to separate the electrodes by manipulating them at the stuffing-boxes H H, and at the same time increasing the current as fast as the carbid is made in quantity sufficient to maintain the circuit. When the said electrodes have been forced apart as far as the mass about them will permit, then the worm-screw pulley D is moved so as to cause the belt C to move in the direction of the arrows, and this will draw the mass of molten carbid between the electrodes slightly outward and tend to bring the electrodes farther apart until parallel. The current should then be further increased and the belt slowly moved until the electrodes are parallel, when the current should be increased to that quantity suitable to the capacity of the electrodes to carry it without undue heat. If more convenient, the current may be started between parallel electrodes by placing some pieces of broken carbon between the ends of them, which will be a temporary conductor until a bridge of carbid is formed. When this is done, a continuous slab of carbid will be formed, as shown at M, Figs. 2 and 3. It may have an arched shape, if the belt is properly speeded, as shown in Fig. 3. The speed of the belt must not be so great as to break the current. The quantity of the current diminishes as the speed of the belt increases, because the slab of conductive carbid becomes thinner and the arch or crescent longer and consequently of higher resistance, and the current increases as the speed is diminished, because the said slab becomes thicker and the arch shorter. The slab M of carbid may thus be made of any desired thickness or any width that may be desired or permissible in the apparatus. As the slab M is drawn toward the outlet the unconverted mixture under it falls over the driving-roller D into any receptacle, and may be returned to the chute B to again go through the apparatus, while the piece of protruding carbid may be broken off in pieces by striking it and transferred by tongs or other means, while any unreduced materials adhering thereto may also be removed and returned to the chute B. The material in the said chute takes the course of the arrows, and being mostly a cool or fresh mixture it does not heat the electrodes, but tends to keep them cool and protects them from the air, and therefore preserves them. The said slab of carbid extends from one electrode to the other, and is thus maintained and builded up by the heat of the current, which passes on the route of the least resistance between them. The heat thus added by the resistance to its passage by the mass of carbid is preserved and kept insulated by the non-conducting mass above and below it, thus causing the energy of the current to perform its utmost work. The gases generated by the decomposition of the oxids escape along the top of the casing and up the flue or stack N.

It is plain that my invention, though specially applicable to the making of metallic carbids, is not limited in its broader aspects to such production, but may be used for other metallurgical operations—as, for instance, for making carborundum from silicon oxid and carbon or the reduction of metallic oxids which are themselves practically non-conductors, but become sufficiently conducting when reduced.

When in this specification and its claims I use the word "ore," I mean to be understood thereby as meaning not only the bodies technically called "ores," but such bodies as calcium oxid and other oxids.

What I claim as my invention, and desire to secure by Letters Patent, is—

1. As an improvement in the art of metallurgy, the process of converting or changing an ore, substantially an insulator of electricity, which consists in establishing between electrodes within a non-conducting mixture of pulverized or granulated ore or oxid and a reducing agent, a conducting path of material which will be heated to incandescence by the passage of a current, passing electricity through said path and by the heat therefrom converting the adjacent portions of the mixture into a conductive body, and gradually drawing the mixture between the electrodes in a direction transverse to the direction of flow of the current through said path, whereby successive portions of the mixture are successively brought into the heating-field and thereby converted into a conducting-body and caused to act as an incandescent conductor to reduce the adjacent portions of the mixture, substantially as described.

2. As an improvement in the art of metallurgy, the process of converting or changing an ore, substantially an insulator of electricity, which consists in establishing between electrodes within a non-conducting mixture of pulverized ore or oxid and carbon, a conducting path of material which will be heated to incandescence by the passage of a current, passing electricity through said path and by the heat therefrom converting the adjacent portions of the mixture into a conductive body, and gradually drawing the mixture between the electrodes in a direction transverse to the direction of flow of the current through said path, whereby successive portions of the mixture are successively brought into the heating-field and thereby converted into a conductive body and caused to act as an incandescent conductor to reduce the adjacent portions of the mixture, substantially as described.

3. As an improvement in the art of metallurgy, the process of converting or changing an ore of calcium commingled with carbon, substantially an insulator of electricity, which consists in establishing between electrodes within a non-conducting mixture of pulverized or granulated calcium oxid and carbon, a conducting path of material which will be heated to incandescence by the passage of a current, passing electricity through said path and by the heat therefrom converting the adjacent portions of the mixture into a calcium carbid, and gradually drawing the mixture between the electrodes in a direction transverse to the direction of flow of the current through said path, whereby successive portions of the mixture are successively brought into the heating-field and thereby converted into a conducting-body and caused to act as an incandescent conductor to reduce the adjacent portions of the mixture, substantially as described.

4. As an improvement in the art of metallurgy, the process of converting or changing an ore of calcium commingled with carbon, substantially an insulator of electricity, which consists in establishing between electrodes within a non-conducting mixture of pulverized or granulated calcium oxid and carbon, a conducting path of material which will be heated to incandescence by the passage of a current, passing electricity through said path and by the heat therefrom converting the adjacent portions of the mixture into calcium carbid, and gradually passing the mixture between the electrodes in a direction transverse to the direction of flow of the current through said path, whereby successive portions of the mixture are successively brought into the heating-field and thereby converted into a conducting-body and caused to act as an incandescent conductor to reduce the adjacent portions of the mixture, and maintaining the resulting slab of carbid within a surrounding cover of unconverted material, substantially as described.

5. The process of producing metallic carbids, which consists in surrounding horizontal electrodes with a mass of pulverized oxid and carbon, in establishing a temporary conducting path between said electrodes, in passing the pulverized mass of oxid and carbon horizontally between the electrodes without breaking contact with the produced carbids, in gradually widening the said slab of produced carbid by the gradual withdrawal of the electrodes, and in finally forming carbid by moving the mixed mass between parallel electrodes extending in the direction of travel of the mass, thereby forming such slab of carbid of the full width of the distance between the electrodes, and in supplying sufficient unconverted material to surround the electrodes and the slab so formed, and in simultaneously moving said unconverted material onward again with the so-formed carbid, substantially as described.

6. In an apparatus for effecting metallurgical operations, the combination of a continuous horizontal mechanical conveyer, two electrodes located in proximity thereto, and means for feeding a mass of material to be treated into said conveyer above and below said electrodes, thereby inclosing them in a mass of the material to be treated in their operation, substantially as described.

7. The combination in an apparatus for effecting metallurgical operations of an endless continuous horizontal mechanical conveyer, and two horizontally-adjustable electrodes placed in proximity thereto and capable of taking a parallel position, thereby affecting material moved by said conveyer, substantially as described.

8. In an apparatus for the treatment of substances by electrical heat, the combination of a conveyer made of wire-cloth the wires of which are severally covered with asbestos, and two electrodes located in proximity to said conveyer, substantially as described.

9. The combination in an apparatus for effecting electrical conversion, of a continuous horizontal mechanical conveyer, and two horizontal electrodes arranged in proximity to its upper surface, substantially as and for the purposes described.

10. The combination in an apparatus for effecting electrical conversion, of a continuous horizontal mechanical conveyer, two horizontal electrodes arranged in proximity to its upper surface, and means for causing the said electrodes to travel above said conveyer and in the same horizontal plane, substantially as described.

11. The combination in an apparatus for effecting electrical conversion, of the belt C, horizontally-adjustable electrodes F in proximity thereto, the adjustable supports R, located above the belt and aiding in supporting the electrodes, and the plates P, located outside of the casing of the apparatus and carrying the moving holders of the electrodes, substantially as described.

In testimony whereof I have signed my name to this specification in the presence of two subscribing witnesses.

ISAIAH L. ROBERTS.

Witnesses:
AUGUSTUS THIBAUDEAU,
THOMAS E. CLARK.